United States Patent
Tayar et al.

(10) Patent No.: US 9,212,930 B2
(45) Date of Patent: Dec. 15, 2015

(54) METHOD, SYSTEM AND APPARATUS FOR REPORTING EVENTS ON A MAP

(71) Applicant: Google Inc., Mountain View, CA (US)

(72) Inventors: Elad Tayar, Tel-Aviv (IL); Omer Ben Ziv, Tel-Aviv (IL)

(73) Assignee: Google Inc., Mountain View, CA (US)

( * ) Notice: Subject to any disclaimer, the term of this patent is extended or adjusted under 35 U.S.C. 154(b) by 10 days.

(21) Appl. No.: 14/186,506

(22) Filed: Feb. 21, 2014

(65) Prior Publication Data

US 2015/0153196 A1 Jun. 4, 2015

Related U.S. Application Data

(60) Provisional application No. 61/769,660, filed on Feb. 26, 2013.

(51) Int. Cl.
*G08G 1/0969* (2006.01)
*G01C 21/36* (2006.01)
*G08G 1/0967* (2006.01)

(52) U.S. Cl.
CPC ........ *G01C 21/3697* (2013.01); *G01C 21/3694* (2013.01); *G08G 1/0969* (2013.01); *G08G 1/096775* (2013.01)

(58) Field of Classification Search
CPC . G08G 1/0967; G08G 1/0968; G08G 1/0969; G08G 1/0104; G08G 1/096816; G08G 1/096822; G01C 21/3492; G01C 21/3691; G01C 21/3694; G01C 21/3697

USPC .............. 340/905, 988, 990, 995.13, 539.13; 701/117, 118

See application file for complete search history.

(56) References Cited

U.S. PATENT DOCUMENTS

| | | | |
|---|---|---|---|
| 6,862,524 B1 * | 3/2005 | Nagda et al. .................. | 701/420 |
| 2006/0046732 A1 * | 3/2006 | Grossman et al. ............ | 455/450 |
| 2007/0208497 A1 * | 9/2007 | Downs et al. ................ | 701/117 |
| 2007/0273555 A1 * | 11/2007 | Amano ......................... | 340/935 |
| 2009/0112452 A1 * | 4/2009 | Buck et al. .................... | 701/117 |
| 2011/0040621 A1 * | 2/2011 | Ginsberg et al. ........... | 705/14.49 |

OTHER PUBLICATIONS

"Waze iPhone App Provides Real-Time, Crowdsourced Traffic Data", [online], Aug. 6, 2009, <http://www.cnet.com/news/waze-iphone-app-provides-real-time-crowdsourced-traffic-data/>, 4 pages.

* cited by examiner

*Primary Examiner* — Hung T Nguyen
(74) *Attorney, Agent, or Firm* — Lerner, David, Littenberg, Krumholz & Mentlik, LLP

(57) ABSTRACT

A method of reporting an event is provided. The method includes selecting, by a device, an icon for an event. The method also includes selecting, by a device, a pin attribute for the event, wherein the pin attribute identifies the side of the road which the event is present. The method also includes presenting, by a device, the selected icon and a pin having the pin attribute at the appropriate location on a dynamic map.

10 Claims, 3 Drawing Sheets

METHOD, SYSTEM AND APPARATUS FOR REPORTING EVENTS ON A MAP

CROSS REFERENCE TO RELATED APPLICATION

This application claims the benefit of the filing date of U.S. Provisional Patent Application No. 61/769,660 filed Feb. 26, 2013, the entire disclosure of which is hereby incorporated herein by reference.

BACKGROUND

Various systems provide navigation services to users. In some examples, these systems may provide near real time traffic information to indicate to users the traffic conditions at various locations. In some examples, this traffic information may be displayed in conjunction with a map.

BRIEF SUMMARY

Aspects of the disclosure provide a method of reporting. The method includes selecting, by a device, an icon for an event; selecting, by a device, a pin attribute for the event, wherein the pin attribute identifies the side of the road which the event is present; and presenting, by a device, the selected icon and a pin having the pin attribute at a location on a dynamic map.

In one example, the device that selects the icon is a server. In another example, the device that selects the icon is a mobile device. In another example, the device that presents the selected icon is a mobile device. The pin attribute may be a tilt of the pin, a shade of the pin, or a color of the pin.

DETAILED DESCRIPTION

Aspects of the disclosure relate to reporting. As an example, a method may include selecting an icon for an event; selecting pin attribute(s) (e.g., tilt, color, shade) for the event, wherein the pin attribute(s)identify the side of the road which the event is present; and presenting the selected icon and a pin having the pin attribute(s) at the appropriate location on a dynamic map.

Figure 1:
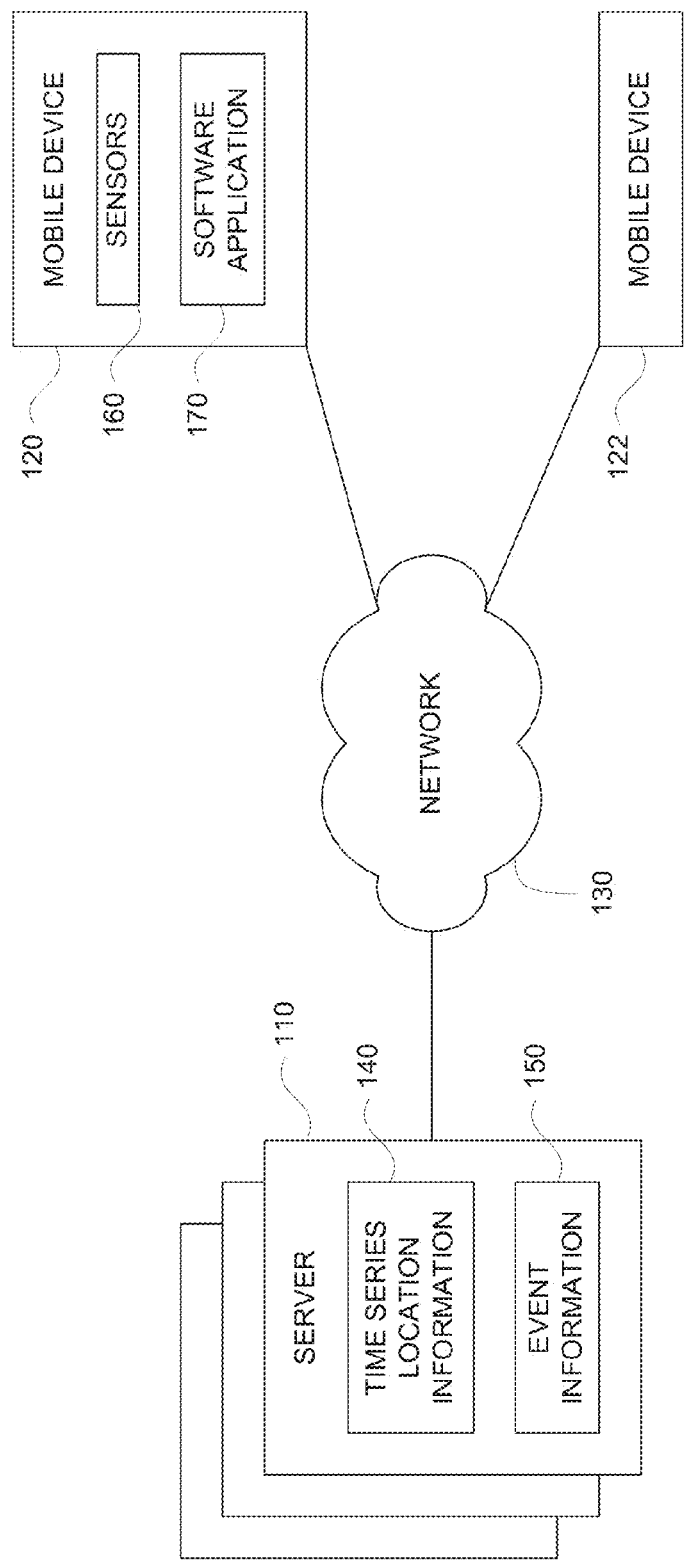
FIG. 1 is a functional diagram of a system in accordance with aspects of the disclosure.
Figure 2:
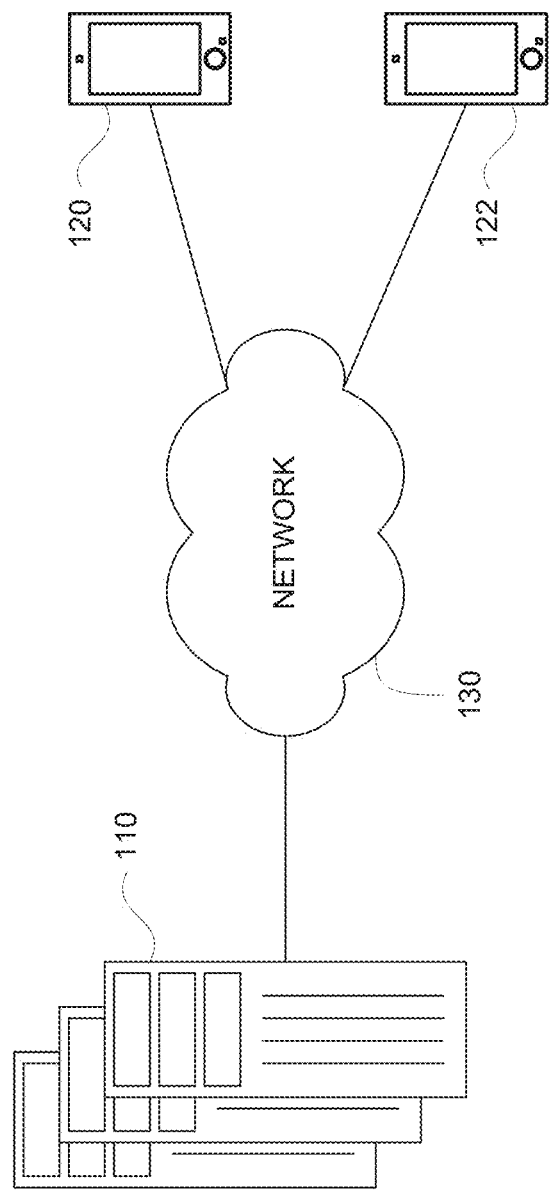
FIG. 2 is a pictorial diagram of the system of FIG. 1.

An example network architecture that may be used to implement the features described herein is illustrated in FIGS. 1 and 2. FIG. 1 is a schematic diagram of a computer system depicting various computing devices that can be used alone or in a networked configuration in accordance with the features described herein. For example, this figure illustrates a network 130 having one or more servers 110 configured to communicate with other mobile devices 120 via a network 130. In one example, the network 130 may include a cellular network.

The servers 110 may receive information from the mobile devices 120. This information may include time series location information 140 and event information 150 transmitted from the mobile device to the server for statistical analysis. Other information can also be transmitted, either pushed or pulled, either manually or automatically, either spontaneously or periodically, from the mobile devices 120 to the servers 110 for data gathering. For example, a user can inform a server of an event, which will thereafter be indicated on a dynamic map generated by a software application.

Each of the mobile devices 120 may have networking capabilities in order to send and receive information from the servers 110. The mobile devices 120 may also be coupled with or otherwise have access to sensors 160 (shown with regard to mobile device 120 only for simplicity). These sensors 160 may include sensors that can be used to learn the speed and direction of the mobile device, such as G.P.S. components.

The mobile devices 120, 122 may also include a software application 170 for generating a dynamic map (shown with regard to mobile device 120 only for simplicity). This dynamic map may be used for navigation. The dynamic map is typically displayed on a mobile device for the benefit of a driving user of the service and can show events (e.g., accident, road work, fallen tree, etc.) reported by the user and/or other users of the system.

Figure 3:
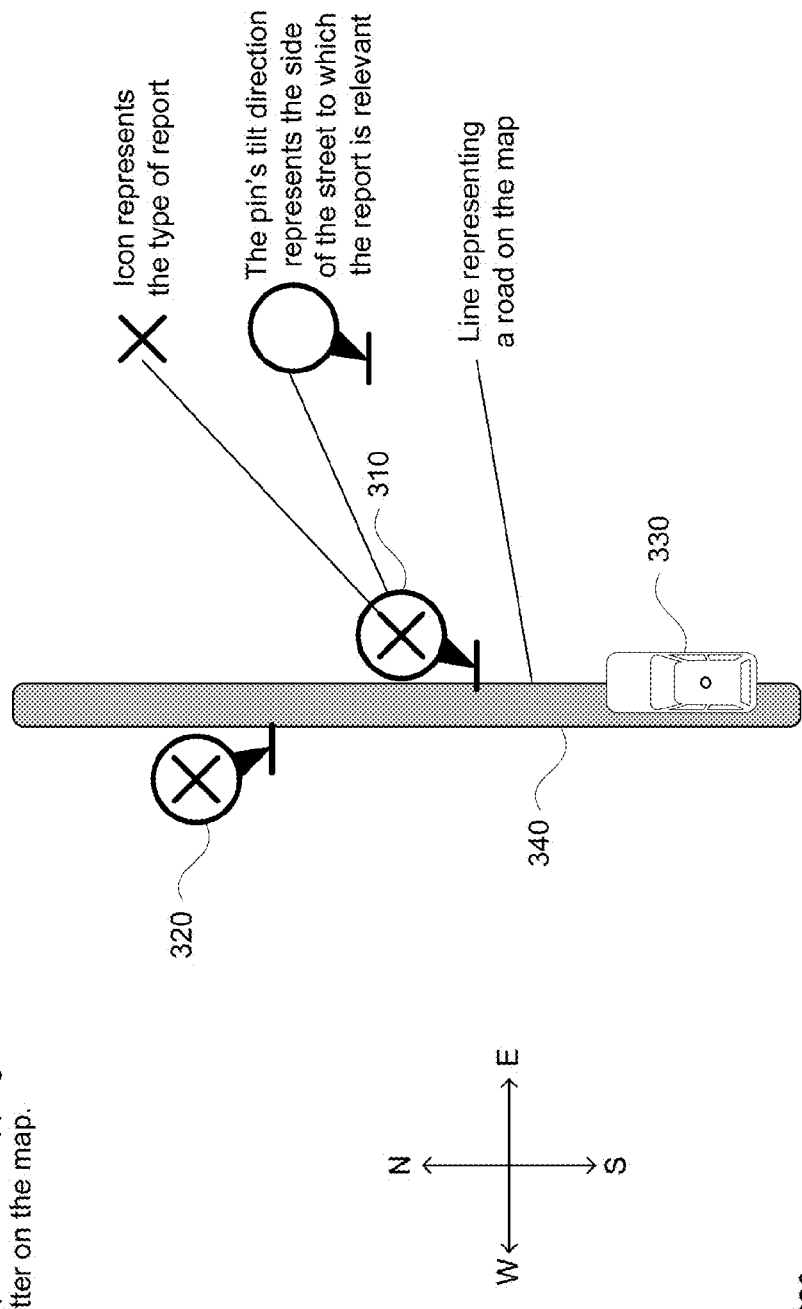
FIG. 3 is a diagram of example data in accordance with aspects of the disclosure.

FIG. 3 is an example of a dynamic map 300. The map 300 includes pins 310, 320 to indicate the appropriate location on the map representing events. These pins also indicate the appropriate side of the road to which such reporting is relevant. For example, the pin may tilt toward the relevant side of the road. Alternatively, the pin can be otherwise marked (e.g., colored or shaded) to represent the relevant side of the road.

The corresponding event for each pin is indicated on the dynamic map using a unique icon. In the example of FIG. 3, an "X" icon of pins 310 and 320 can represent accidents, while an "O" icon of pin can represent road work. Other icons may be employed.

As shown in FIG. 3, the user driving north on a road will approach a first event on the right side (Pin 310's tilt direction is right) and a second event on the left side (Pin 320's tilt direction is left). The "X" icon in each pin 310, 320 indicates an accident. In some embodiments, other information, including of the time of the first report of that event, can be presented with an icon to provide the user with additional details regarding the event.

It is contemplated that system users report and update events to provide current information. Since the server knows the direction of a reporting user, the server is able to differentiate between the reporting user's right side and the reporting user's left side. In some embodiments, a report of an event automatically indicates the event as being on the side of the reporting user, although the reporting user can indicate the "other side" as an alternative. In presenting the map image to a driving user, the server determines the driving user's direction on the road and displays the pin oriented toward the side of the road that is correct for the driver regardless of the side of the road for the user that reported the incident.

In some embodiments, the method of reporting includes:
1) selecting an icon for an event;
2) selecting pin attribute(s) (e.g., tilt, color, shade) for the event, wherein the pin attribute(s)identify the side of the road which the event is present; and
3) presenting the selected icon and a pin having the pin attribute(s) at the appropriate location on a dynamic map.

Step 3) is typically performed by the mobile device. However, step 1) and step 2) are performed by the server or by the mobile device in whole. Alternatively, step 1) and step 2) can be performed by the server in part and the mobile device in part.

The invention claimed is:
1. A method of reporting an event, the method comprising:
selecting, by a first device, an icon for an event;

selecting, by the first device, a pin attribute for the event, wherein the pin attribute identifies a side of a road on which the event is present, the road extending in a first direction along a reference axis, the pin attribute comprising a tilt of the pin;

presenting, by a second device, the selected icon and a pin having the pin attribute at a location on a dynamic map, the pin comprising an elongated body, and the icon appearing within the elongated body; and positioning, by the second device, the pin on a pin platform that extends in a direction perpendicular to the direction of the reference axis so that the pin tilts at an acute angle away from the reference axis and at an obtuse angle relative to the pin platform.

2. The method of claim 1, wherein the first device that selects the icon is a server.

3. The method of claim 1, wherein the first device that selects the icon is a mobile device.

4. The method of claim 1, wherein the second device that presents the selected icon is a mobile device.

5. The method of claim 1, wherein the pin attribute further comprises a shade of the pin.

6. The method of claim 1, wherein the pin attribute further comprises a color of the pin.

7. The method of claim 1, wherein the elongated body comprises a main body and a tail extending from the main body.

8. The method of claim 7, wherein the main body comprises a circular shape.

9. The method of claim 1, wherein the first device and the second device are the same device.

10. The method of claim 1, wherein the first device and the second device are different devices.

* * * * *